United States Patent
Lippitsch

(10) Patent No.: US 6,258,002 B1
(45) Date of Patent: Jul. 10, 2001

(54) TWO-STAGE TRANSFER GEAR-BOX

(75) Inventor: Klaus Lippitsch, Graz (AT)

(73) Assignee: Steyr-Daimler-Puch Fahrzeugtechnik AG & Co KG, Vienna (AT)

( * ) Notice: Subject to any disclaimer, the term of this patent is extended or adjusted under 35 U.S.C. 154(b) by 0 days.

(21) Appl. No.: 09/462,040

(22) PCT Filed: Jun. 30, 1998

(86) PCT No.: PCT/AT98/00161

§ 371 Date: Dec. 29, 1999

§ 102(e) Date: Dec. 29, 1999

(87) PCT Pub. No.: WO99/01310

PCT Pub. Date: Jan. 14, 1999

(30) Foreign Application Priority Data

Jul. 1, 1997 (AT) .................................................. 1123/97

(51) Int. Cl.$^7$ .......................... B60K 17/344; F16H 37/04
(52) U.S. Cl. ........................... 475/204; 475/206; 180/247
(58) Field of Search .................................. 475/204, 206, 475/221, 252, 903; 180/247; 74/665 GC, 665 GE

(56) References Cited

U.S. PATENT DOCUMENTS

| 4,215,593 | * | 8/1980 | Shono et al. ..................... 475/204 |
| 4,726,254 | * | 2/1988 | Kubo et al. ..................... 475/206 X |
| 4,804,061 | * | 2/1989 | Kameda ........................... 180/247 |
| 4,854,413 | * | 8/1989 | Kameda et al. ..................... 180/247 |
| 4,907,473 | * | 3/1990 | Fujitani et al. ..................... 475/250 |
| 5,246,408 | * | 9/1993 | Kobayahi ........................... 475/221 |
| 5,499,951 | * | 3/1996 | Showalter ........................... 475/204 |
| 5,700,222 | * | 12/1997 | Bowen ............................. 475/204 |
| 6,030,312 | * | 2/2000 | Nesbitt et al. ..................... 475/205 X |
| 6,117,038 | * | 9/2000 | Nishiji et al. ....................... 475/221 |

FOREIGN PATENT DOCUMENTS

19524682-A1 * 1/1997 (DE) .
2035930 * 10/1979 (GB) .

* cited by examiner

Primary Examiner—Charles A Marmor
Assistant Examiner—Ankur Parekh
(74) Attorney, Agent, or Firm—Bachman & LaPointe, P.C.

(57) ABSTRACT

A two-stage power-split gear unit for automobiles consists of an input shaft (2), of a planetary gear unit as an off-road gear stage, of a differential gear unit, of a first output shaft (13) and of a second output shaft (15) which is connected to an offset output (19), the input shaft (2) being capable of being coupled selectively to the sun wheel (5) and to the planet carrier (7) of the planetary gear unit, the planet wheels (8) of which roll in a ring gear (9) fixed in space, and the differential gear unit having compensating wheels (11) and first and second output wheels (14, 16) driven by these and in each case located on the first and the second output shafts (13, 15). In order to arrange the output wheel (16) for the front axle as far forward as possible and to save space, the compensating wheels (11) are mounted on the planet carrier (7) of the planetary gear unit of the off-road gear stage, and the first output wheel (14) is arranged in front of the planetary gear unit (5, 8, 9) of the off-road gear stage and the second output wheel (16) is arranged behind said planetary gear unit.

9 Claims, 5 Drawing Sheets

TWO-STAGE TRANSFER GEAR-BOX

The invention is concerned with a two-stage power-split gear unit for automobiles, consisting of a casing, of an input shaft, of a planetary gear unit as an off-road gear stage, of a differential gear unit, of a first output shaft and of a second output shaft, the planetary gear unit consisting of a sun wheel, of a planet carrier with planet wheels and of a ring gear, the ring gear being connected fixedly in terms of rotation to the casing and the force flux from the input shaft to the differential gear unit taking place selectively via one of the other two members of the planetary gear unit, and the differential gear unit having compensating wheels and first and second output wheels driven by these and in each case located on the first and the second output shaft.

Power-split gear units of this type are referred to as "single offset" when they are designed with an offset output. Usually, in automobiles with all-wheel drive, they are flanged to the-longitudinally installed engine/transmission unit. The offset output is then usually that intended for the front axle. With increasingly larger and longer engine/transmission units (multi-cylinder engine, a large number of transmission speeds), it is advisable for the power-split gear unit to have as compact, in particular as short a design as possible and for the offset output to the front axle to be provided as far forward as possible.

EP 531 088 A1 discloses a power-split gear unit of this type, in which, in order in the longitudinal direction, first a planetary gear unit as an off-road gear stage, then, at some distance from this, a planetary differential, then a locking clutch and only then the output wheel for the front axle are provided. This power-split gear unit therefore has a very long build, and the rear output wheel requires a long cardan shaft to the front axle, this also being unfavorable for reasons of vibration. The distance between the off-road gear stage and the differential has a particularly adverse effect on the construction space, weight and characteristic bending frequency.

DE 41 13 965 C2 discloses a similar power-split gear unit which, following the off-road gear group, has a bevel wheel differential. This differential additionally increases the overall length, as compared with a planetary differential, without allowing the output wheel for the front axle to be transferred forward.

The object of the invention, therefore, is for a generic power-split gear unit to have as compact (in particular, short) and as vibration-resistant a design as possible and for the output wheel for the front axle to be arranged as far forward as possible.

For this purpose, according to the invention, the compensating wheels are mounted on the planet carrier of the planetary gear unit of the off-road gear stage, and the first output wheel is arranged in front of the planetary gear unit of the off-road gear stage and the second output wheel is arranged behind said planetary gear unit.

The planetary gear unit is thus combined with the differential to form a subassembly which is very short in the axial direction and which makes it possible to arrange one output wheel in front of the subassembly and one behind the latter. Hence, there is a reduction in weight and cost due to the multiple function of at least the planet carrier. Consequently, it also becomes possible to transfer the output to the front axle forward and, overall, to have a very rigid drive train.

In a first embodiment, the compensating wheels are bevel wheels which are arranged between the planet wheels of the planetary gear unit of the off-road gear stage and which mesh directly with the first and second output wheels Thus, the bevel wheels meshing with the two output wheels bridge the planetary gear unit. Since said bevel wheels are arranged between the planet wheels in a circumferential direction, the diameter of the subassembly is not appreciably increased thereby. The ratio of the torque distribution between the two output wheels can be adjusted by the choice of their number of teeth, the axis of the compensating wheels then being inclined correspondingly.

A particularly simple design with a large number of identical parts is obtained if the axes of the compensating wheels are directed radially.

In a second embodiment, the compensating wheels are spur wheels which mesh, on the one hand, with the first or second output wheel and, on the other hand, with a first intermediate wheel, and a second intermediate wheel meshes with the second or first output wheel, the first and second intermediate wheels being connected fixedly in terms of rotation to a shaft mounted in the planet carrier. This embodiment affords a great degree of freedom in the choice of the ratio of the torque distribution and makes it possible to mount the compensating wheels on that side of the planetary gear unit which faces the first output wheel.

In a particularly simple and cost-effective further development of the second embodiment, the compensating wheels are arranged coaxially relative to the planet wheels of the planetary gear unit and mesh with the first output wheel, and the first intermediate wheels are arranged between the compensating wheels.

In a third embodiment, the compensating wheels are pairs of intermeshing helically toothed spur wheel rollers, of which one meshes with the first output wheel and the other with the second output wheel, the first and second output wheels being helically toothed spur wheels. A differential (this is sometimes also referred to as a developable differential) which takes up particularly little construction space is obtained in this way. If there is an appropriate design, some locking action may also be exerted, so that there is no need for an additional differential lock.

A simplification of the third embodiment is also achieved in that the pairs of spur wheel rollers are guided, without any shaft, in the planet carrier, and in that each spur wheel roller has a clearance at the location of one of the two output wheels. This makes it possible to reduce the space requirement even further and to design the spur wheel rollers as identical parts.

The planetary gear unit for the off-road gear stage may be designed and connected up in very different ways. The gear shift may take place by the selective connection of the ring gear to either the casing or the planet carrier or by the selective connection of the input shaft to one or other member of the planetary gear unit. In one possible embodiment, the ring gear is fixed to the casing and, in order to select the off-road gear stage, a sliding sleeve is provided, of which the front end is coupled by means of first coupling teeth to the input shaft and the rear end is capable of being coupled by means of second coupling teeth to the sun wheel or to the planet carrier of the planetary gear unit, the coupling sleeve having at its front end a ring for the engagement of a shift fork. As a result, this ring can be transferred right to the front, thus reducing the overall length. The ring gear fixed to the casing makes it easier to mount and center the planetary gear unit.

In a preferred development, the planet carrier carries a hollow shaft which extends forward through the first output wheel and the front end of which is mounted in a bearing and has a radial collar which forms with the ring at the front end of the sliding sleeve a synchronizing device for the selection of the off-road gear. The advantages of synchronization are obvious. It is, as a result, achieved at a particularly low outlay in structural terms.

The invention is described and explained below by means of figures of which:

Figure 1:
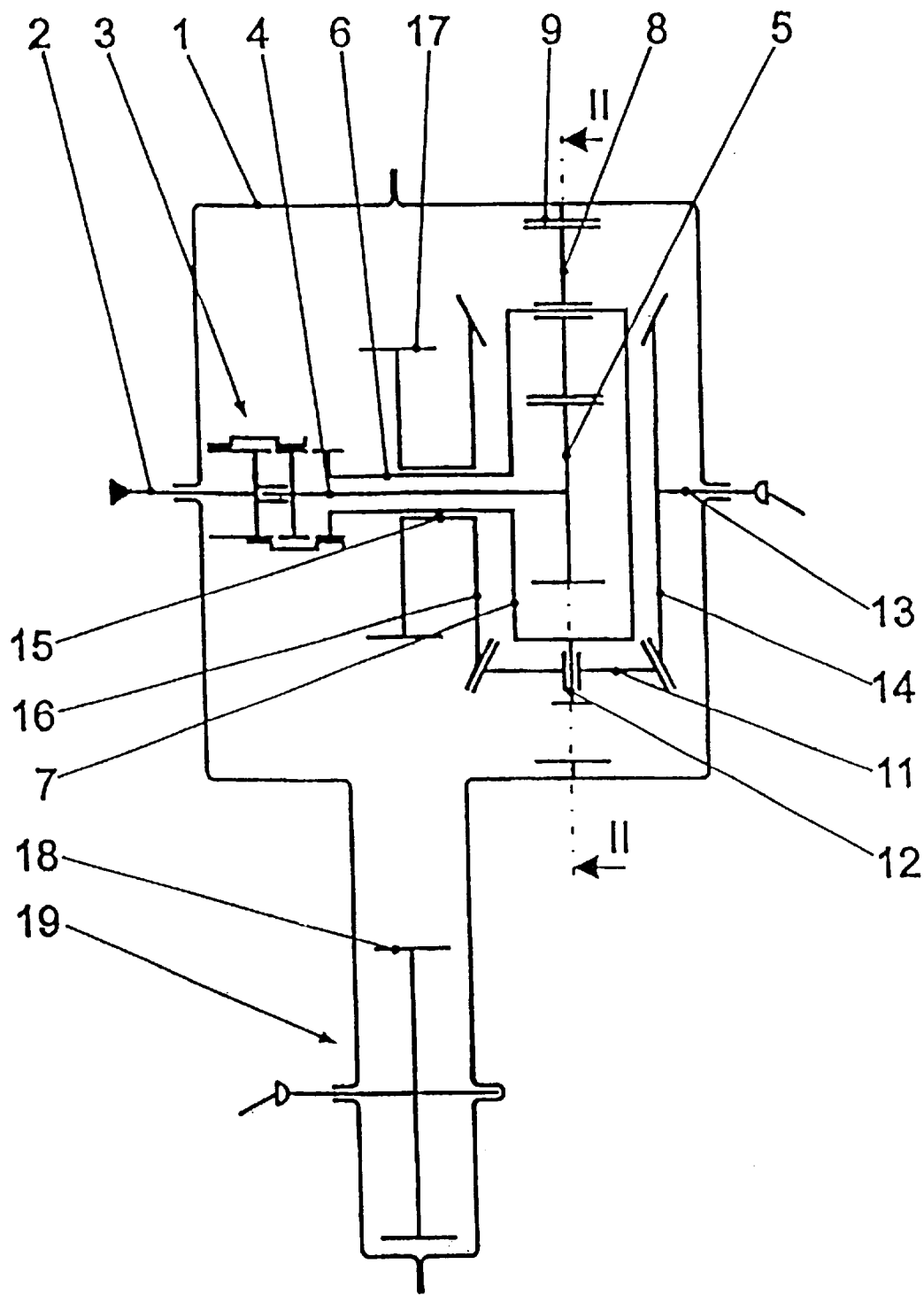
FIG. 1 shows diagrammatically, in longitudinal section, a first embodiment of the power-split gear unit according to the invention.

In FIG. 1, which shows the first exemplary embodiment, the casing is designated by 1 and the input shaft coming from an engine/transmission unit, not illustrated, is designated by 2. In one design example, the input shaft 2 drives by means of a shift clutch 3 either a sun wheel shaft 4 or a planet carrier shaft 6. Said sun wheel shaft drives a sun wheel 5 which is part of a planetary gear unit forming the off-road gear group, and the planet carrier shaft 6 drives a planet carrier 7, on which planet wheels 8 are mounted rotatably. These planet wheels 8 mesh with a ring gear 9 mounted fixedly in space in the casing 1. The sun wheel 5, planet carrier 7, planet wheels 8 and ring gear 9 form the planetary gear unit serving as the off-road gear group. However, the members of the planetary gear unit could also be arranged and connected differently, for example with a ring gear which is capable of being coupled selectively to the casing or to the planet carrier.

Figure 2:
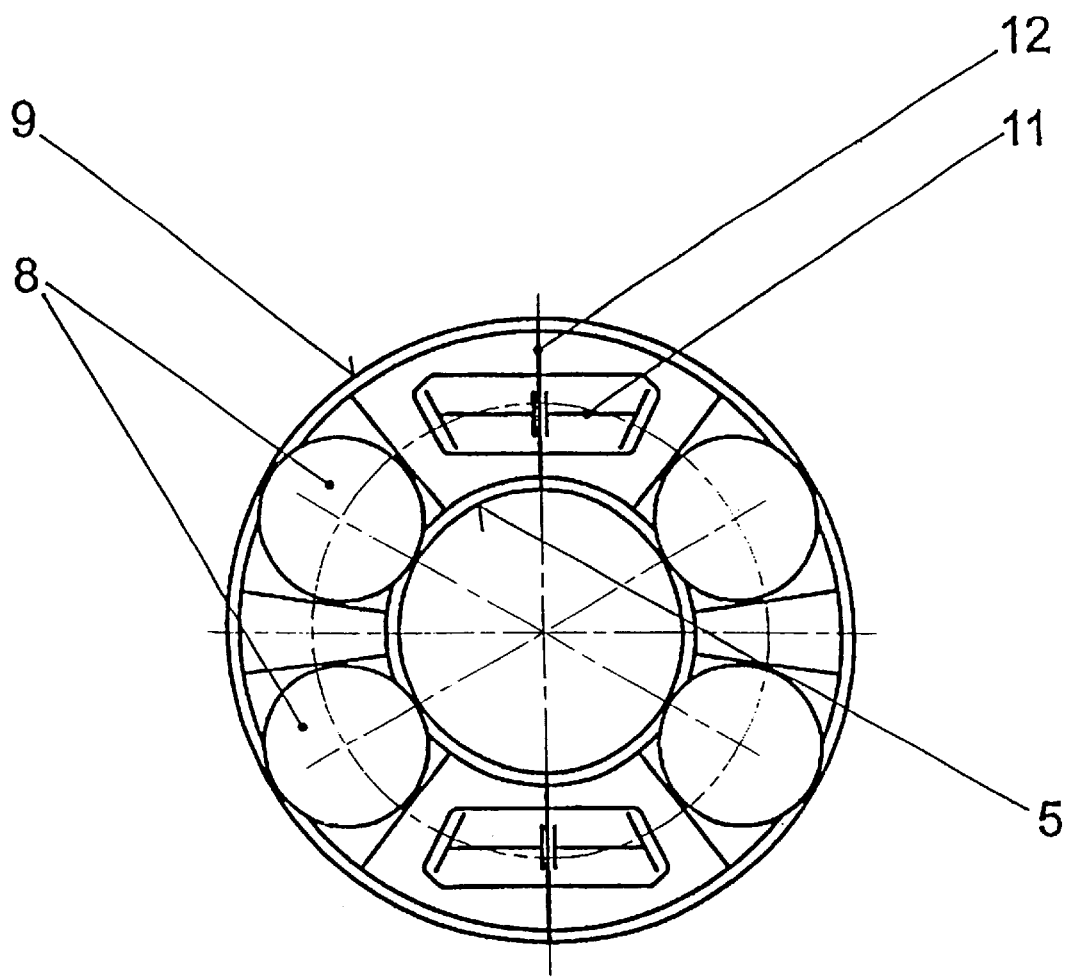
FIG. 2 shows a cross section according to II—II in FIG. 1.

Arranged between the planet wheels 8 in the circumferential direction (see FIG. 2) are compensating wheels 11 which are designed as bevel wheels and which are rotatable about axes 12 connected to the planet carrier 7 and, in this case, radial. The compensating wheels 11 mesh, on one side of the planetary gear unit, with a first output wheel 14 seated on a first output shaft 13 (leading to the rear axle) and, on the other hand, with a second output wheel 16 on a second output shaft 15. The two output wheels 14, 16 are likewise bevel wheels. The second output shaft 15 is arranged in front of the planetary gear unit, that is to say on the side of the input shaft, and carries a first transmission wheel 17 which drives in any desired way (for example, via a tension rod) a second transmission wheel 18, from which an output 19 for the front axle emanates so as to be offset relative to the input shaft 2 and to the first output shaft 13.

Figure 3:
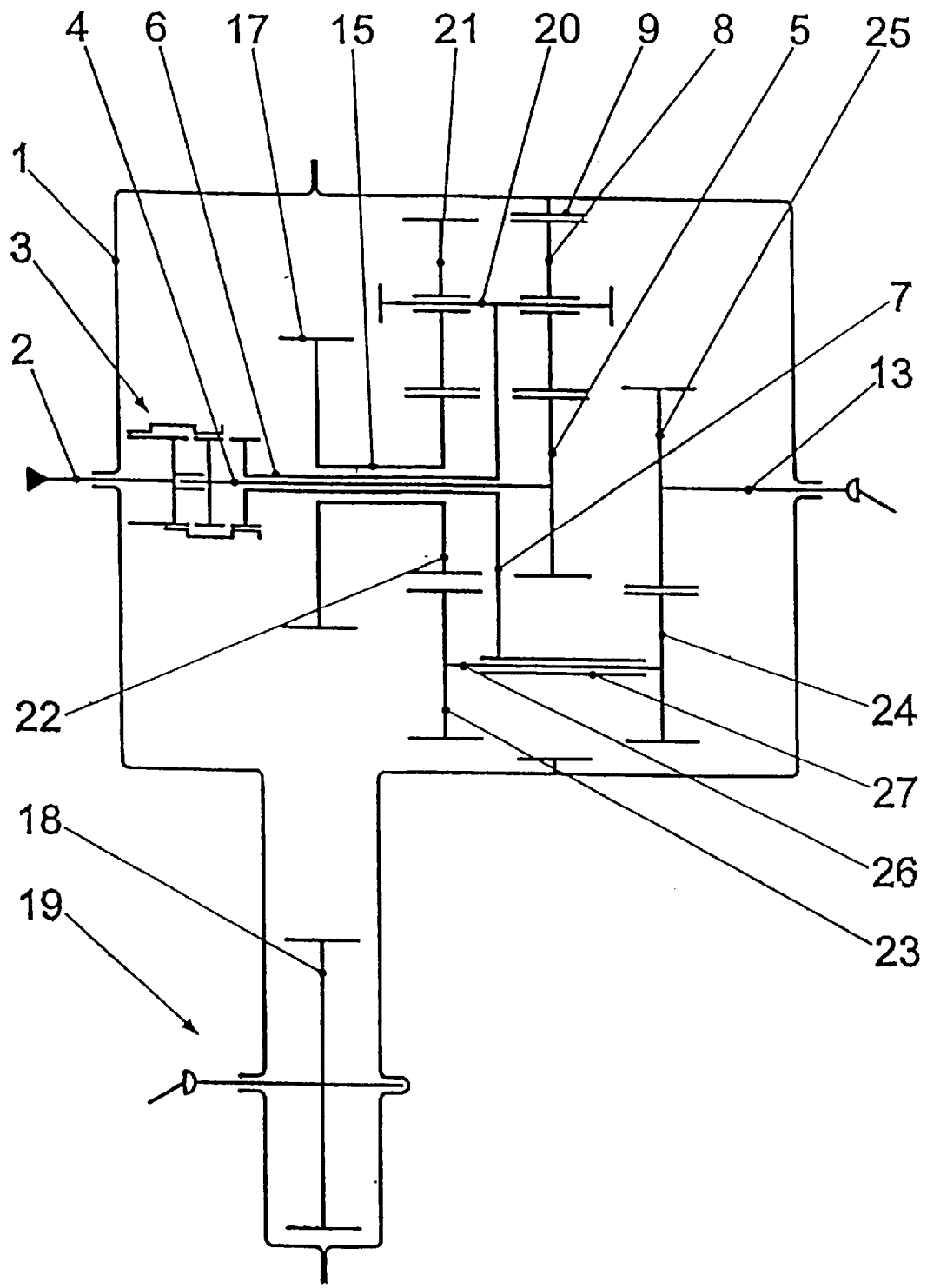
FIG. 3 shows diagrammatically, in longitudinal section, a second embodiment of the power-split gear unit according to the invention.

FIG. 3 shows a second embodiment. The reference symbols 1 to 9, 13, 15, 17, 18, 19 are also used here. Mounted rotatably on axes 20 of the planet carrier 7, on the side facing away from the input shaft 2, are planet wheels 8 which, as in FIG. 1, mesh with a sun wheel 5 and with a ring gear 9 fixed to the casing and which form the off-road gear group. Arranged on that side of the planet carrier 7 which faces the input shaft are compensating wheels 21 which are designed as spur wheels and, for reasons of symmetry, are multiple. The compensating wheels 21 mesh, on the one hand, with a second output wheel 22 and, on the other hand, each with a first intermediate wheel 23. This first intermediate wheel 23 is connected fixedly in terms of rotation, via a shaft 26 mounted in a bore 27 of the planet carrier 7, to a second intermediate wheel 24 which, in turn, meshes with a first output wheel 25. A first output shaft leads from the latter to the rear axle.

Figure 4:
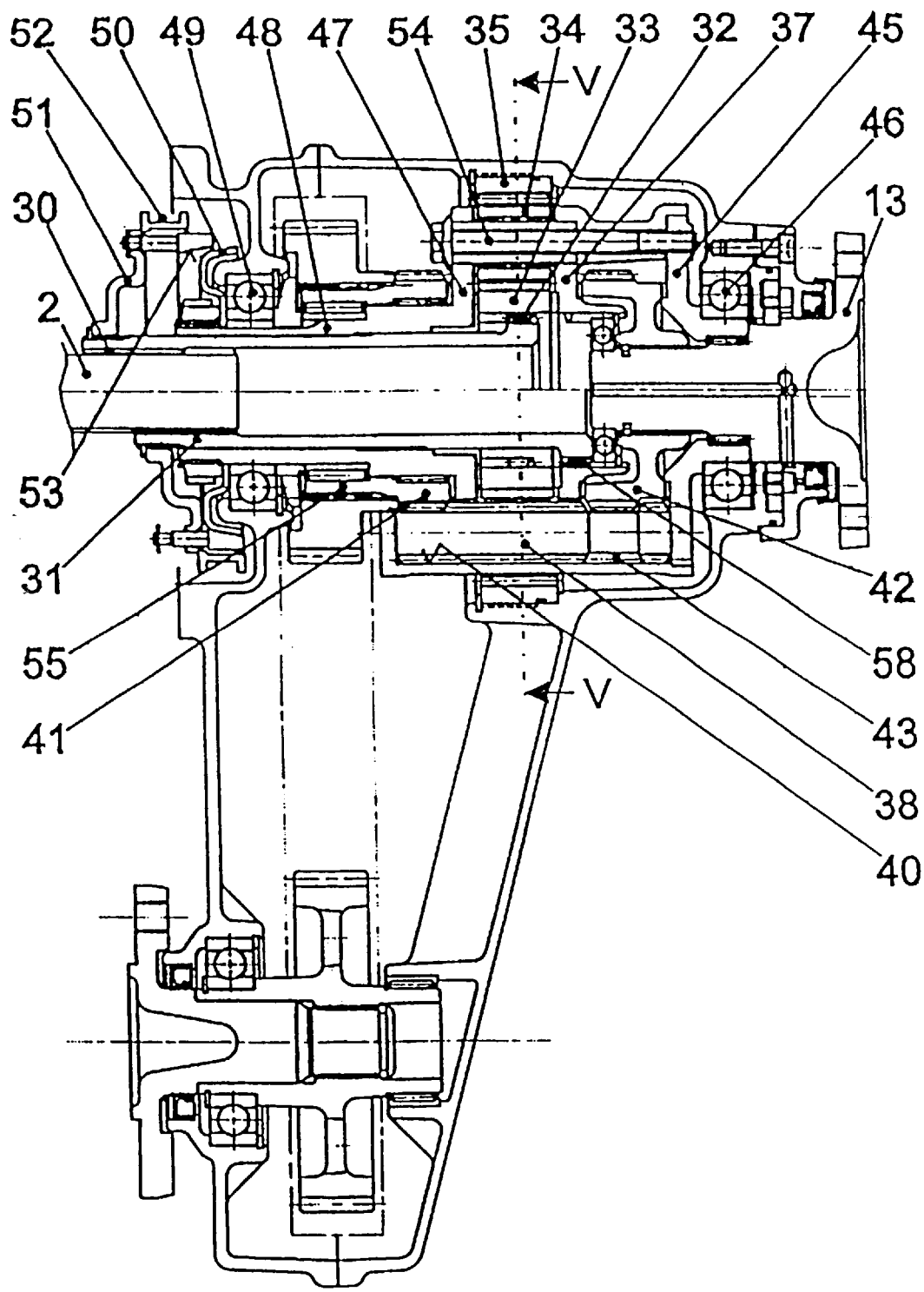
FIG. 4 shows, in longitudinal section, a third embodiment of the power-split gear unit according to the invention.
Figure 5:
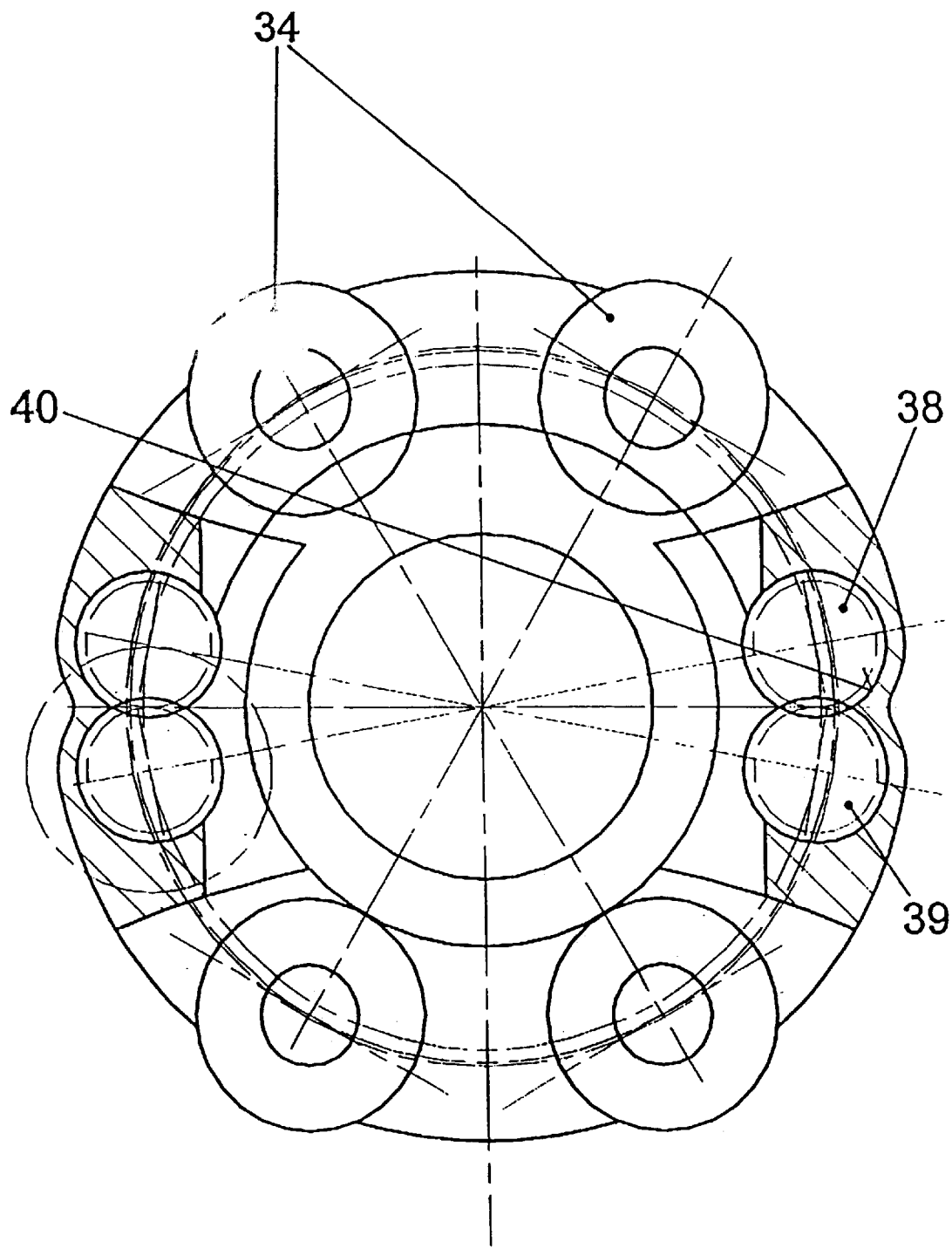
FIG. 5 shows a cross section according to V—V in FIG. 4.

In the third embodiment according to FIGS. 4 and 5, the input shaft 2 is connected fixedly in terms of rotation via first coupling teeth 30 to the front end of a sliding sleeve 31 which has at its rear end second coupling teeth 32 engaging into corresponding teeth of a sun wheel 33 (top half of the figure). Planet wheels 34 mesh on the inside with the sun wheel 33 and on the outside with a ring gear 35 fixed to the casing. The planet wheels 34 are mounted in a planet carrier 37. Helically toothed spur wheel rollers 38, 39 are received rotatably between the planet wheels 34 in the circumferential direction so as to be axially parallel and to mesh with one another. These rollers have a highly helical toothing, so that they form so-called developables. The two spur wheel rollers are not mounted on a shaft, but are guided only in an inwardly open bore 40 in the planet carrier 37. The first spur wheel roller 38 meshes with a second output wheel 41 and the second spur wheel roller 39 (FIG. 5) with a first output wheel 42. The spur wheel roller 38 therefore has a clearance 43 in the vicinity of the first output wheel 42.

The planet carrier 37, together with a rear flange 45 and a front flange 47 which are held together by screw bolts 54 distributed over the circumference, forms a cage which at the rear is guided in a bearing 46 and at the front merges into a hollow shaft 48 which, in turn, is guided in a front planet carrier bearing 49. The hollow shaft 48 terminates in a radial collar 50.

The sliding sleeve 31 is provided at its front end with a ring 51 which has a groove 52 for a shift fork, not illustrated, and a, for example, conical face 53 for a synchronizing device cooperating with the radial or, here, conical collar 50.

In FIG. 4, above the center line of the input shaft 2, the sliding sleeve 31 is in the position which corresponds to the off-road gear and in which the second coupling teeth 32 engage into the sun wheel 33. Below the center line, the sliding sleeve 31 is located in the stage which corresponds to the on-road gear and in which the coupling teeth 32 engage into corresponding teeth 58 of the planet carrier 37.

What is claimed is:

1. A two-stage power-split gear unit for automobiles, comprising of a casing (1), of an input shaft (2), of a planetary gear unit as an off-road gear stage, of a differential gear unit, of a first output shaft (13) and of a second output shaft (15), the planetary gear unit comprising of a sun wheel (5; 33), of a planet carrier (7; 37) with planet wheels (8; 34) and of a ring gear (9; 35), which are capable of being coupled in various ways to one another and to the casing for the selection of an off-road gear and of an on-road gear, and the differential gear unit having compensating wheels (11; 21; 38, 39) and first and second output wheels (14, 16; 22, 25; 42, 41) driven by these and in each case located on the first and the second output shaft (13, 15; 13, 55), wherein the compensating wheels (11; 21; 38, 39) are mounted in the planet carrier (7; 37) of the planetary gear unit of the off-road gear stage, and wherein the first output wheel (14; 25; 42) is arranged in front of the planetary gear unit (5, 8, 9; 33, 34, 35) of the off-road gear stage and the second output wheel (16; 22; 41) is arranged behind said planetary gear unit.

2. The two-stage power-split gear unit as claimed in claim 1, wherein the compensating wheels (11) are bevel wheels which are arranged between the planet wheels (8) of the planetary gear unit of the off-road gear stage and which mesh directly with the first and second output wheels (14, 16).

3. The two-stage power-split gear unit as claimed in claim 2, wherein the axes (12) of the compensating wheels (11) are directed radially.

4. The two-stage power-split gear unit as claimed in claim 1, wherein the compensating wheels (21) are spur wheels which mesh, on the one hand, with the first or second output wheel (22, 25) and, on the other hand, with a first intermediate wheel (23), and wherein a second intermediate wheel (24) meshes with the second or first output wheel (25, 22), the first and second intermediate wheels (23, 24) being connected fixedly in terms of rotation to a shaft (26) mounted in the planet carrier (7).

5. The two-stage power-split gear unit as claimed in claim 4, wherein the compensating wheels (21) are arranged coaxially relative to the planet wheels (8) of the planetary gear unit and mesh with the second output wheel (22), and wherein the first intermediate wheels (23) are arranged between the compensating wheels (21).

6. The two-stage power-split gear unit as claimed in claim 1, wherein the compensating wheels (38, 39) are pairs of intermeshing helically toothed spur wheel rollers, of which one (39) meshes with the first output wheel (42) and the other (38) with the second output wheel (41), the first and second output wheels (42, 41) being helically toothed spur wheels.

7. The two-stage power-split gear unit as claimed in claim 6, wherein the pairs of spur wheel rollers (38, 39) are guided, without any shaft, in the planet carrier (37), and wherein each spur wheel roller (38, 39) has a clearance (43) at the location of one of the two output wheels (42, 41).

8. The two-stage power-split gear unit as claimed in claim 1, wherein the ring gear (9; 35) is fixed in space and, for the selection of the off-road gear stage, a sliding sleeve (31) is provided, of which the front end is coupled by means of first coupling teeth (30) to the input shaft (2) and the rear end is capable of being coupled by means of second coupling teeth (32) to the sun wheel (33) or to the planet carrier (37) of the planetary gear unit, the sliding sleeve (31) having at its front end a ring (51) for the engagement of a shift fork.

9. The two-stage power-split gear unit as claimed in claim 8, wherein the planet carrier (37) forms a hollow shaft (48) which extends forward through the first output wheel (41) and the front end of which is supported in a bearing (49) and has a radial collar (50) which, with the ring (51) at the front end of the sliding sleeve (31), forms a synchronizing device for the selection of the off-road gear stage.

* * * * *